(12) United States Patent
Bala et al.

(10) Patent No.: US 8,064,637 B2
(45) Date of Patent: Nov. 22, 2011

(54) DECODING OF UV MARKS USING A DIGITAL IMAGE ACQUISITION DEVICE

(75) Inventors: Raja Bala, Webster, NY (US); Reiner Eschbach, Webster, NY (US); Yonghui Zhao, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 764 days.

(21) Appl. No.: 12/191,721

(22) Filed: Aug. 14, 2008

(65) Prior Publication Data
US 2010/0040282 A1 Feb. 18, 2010

(51) Int. Cl.
*G06K 9/00* (2006.01)
(52) U.S. Cl. ......................... 382/100; 382/135
(58) Field of Classification Search .................. 382/100, 382/135
See application file for complete search history.

(56) References Cited

U.S. PATENT DOCUMENTS

| 4,185,304 | A | | 1/1980 | Holladay | |
|---|---|---|---|---|---|
| 4,299,325 | A | * | 11/1981 | Quinton et al. | 209/553 |
| 5,136,401 | A | * | 8/1992 | Yamamoto et al. | 358/474 |
| 6,470,093 | B2 | * | 10/2002 | Liang | 382/135 |
| 2007/0176966 | A1 | * | 8/2007 | Morimoto et al. | 347/41 |
| 2007/0262579 | A1 | | 11/2007 | Bala et al. | |
| 2007/0264476 | A1 | | 11/2007 | Bala et al. | |

* cited by examiner

*Primary Examiner* — Tom Y Lu
(74) *Attorney, Agent, or Firm* — Fay Sharpe LLP

(57) ABSTRACT

A method and system for identifying a fluorescence mark in a printed document includes using an image acquisition device to derive an input digital image. For each pixel of at least one of the input image color channels, the gray value is adjusted to define a filtered digital image including a plurality of pixels each defined by an adjusted gray value. A binary image is derived that that represents the filtered digital image. The binary image includes a binary representation of the fluorescence mark and a binary representation of the background. At least one morphological operation is performed on the binary image. An ASCII character for the binary representation of the fluorescence mark (or each constituent character thereof) is derived and compared to a known security code to authenticate the printed document.

20 Claims, 4 Drawing Sheets

DECODING OF UV MARKS USING A DIGITAL IMAGE ACQUISITION DEVICE

BACKGROUND

Security is an important concern in the realm of documents and digital production and/or reproduction of documents. Known digital image printing/copying systems produce documents of such high quality that a need has been identified to prevent effective printing/copying of certain documents such as high-value printed items including tickets, financial instruments, security passes, and the like. Known techniques include printing the original document in a manner such that it includes a digital "watermark" using only conventional paper and toner or ink. A digital watermark is defined as information, for example one or more letters, words, symbols or patterns, that is at least partially (preferably fully or at least substantially) hidden in a printed image under normal viewing conditions but that is more clearly discernable under certain specialized viewing conditions. Unauthorized reproduction of documents including such digital watermarks typically degrades or obscures the digital watermark, which can aid in detection of counterfeit documents.

A fluorescence mark (also sometimes referred to as a "UV mark") is one example of a known digital watermark. Methods and systems are known for including fluorescence marks in printed documents using conventional papers (e.g., ordinary "copy paper" or "printer paper") and ordinary inks/toners (e.g., CMYK ink/toner), specifically by using metameric colorant mixtures. Under visible lighting conditions (e.g., electromagnetic radiation wavelengths of about 400-700 nanometers (nm), the different colorant mixtures that are printed on respective adjacent portions of the paper together define an overall printed document region that appears substantially uniform in color. Under ultraviolet (UV) lighting (e.g., electromagnetic radiation wavelengths shorter than about 400 nm), these different colorant mixtures exhibit different UV absorption and, thus, different suppression of UV fluorescence of the optical brightening agents used in conventional printing/copying papers such that the region printed with the colorant mixture that suppresses less of the substrate fluorescence appears as a lighter/brighter region while the adjacent area printed with the colorant mixture that strongly suppresses substrate fluorescence appears as a darker region. These contrast variations under UV lighting are used to create watermark patterns, e.g., numbers, letters, symbols, shapes.

An example of this is shown in FIG. 1, wherein a colorant mixture "B" is selected and applied to patch area BP which, in this example, is shaped as the alphanumeric symbol "0". Further, a colorant mixture "A" is selected and applied to patch area AP arranged in substantially close spatial proximity to patch area BP, and thereby providing a background around/adjacent patch area BP. Both colorant mixture A and colorant mixture B are comprised of a suitably selected colorant or colorant mixtures, but colorant mixtures A and B are different mixtures. Each colorant mixture A or B may be, for example, either a single CMYK colorant or any mixture of CMYK colorants. In the illustrated example, colorant mixture A will be selected so as to provide higher UV absorption (greater substrate fluorescence suppression) than that selected for colorant mixture B. The colorant mixtures A and B will also be selected to match each other closely in their average color and luminance when viewed under visible light conditions. As shown at UV in FIG. 1, under UV lighting conditions, patch BP will appear brighter as compared to patch AP, due to the relatively limited suppression of the fluorescence of the optical brightening agents in the paper substrate as compared to the patch AP, thus forming a watermark W1. In contrast, under visible light conditions as shown at VIS, patches AP,BP are at least substantially indistinguishable. By way of example, an approximate 50% grayscale gray colorant mixture may be realized with a halftone of black (K) colorant only and used for colorant mixture B to print patch BP. This may then be color-matched against a colorant mixture comprising yellow (Y) colorant mixed with enough cyan (C) and magenta (M) to yield a similar approximate 50% grayscale gray colorant mixture A which is used to print the patch AP. With the given high area coverage of colorant mixture A, this colorant mixture will provide much higher absorption of UV or suppression of native substrate fluorescence as compared to the patch BP, so that under UV lighting conditions, the patch BP will be readily apparent as a watermark W1. The two colorant mixtures will appear quite nearly identical "gray" under normal visible light viewing as shown at VIS in FIG. 1. Thus, when a document including such a fluorescence mark is subjected to UV illumination, the watermark W1 is revealed. A printed "look-alike" document or mere photocopy will not include the watermark.

It should be noted that here and in the following, we use the terms "suppress" or "selectively suppress" to indicate the property of the first colorant mixture as having a higher UV suppression than the corresponding second colorant mixture.

Additional details and variations relating to fluorescence marks are disclosed in U.S. patent application Ser. No. 11/382,897 filed May 11, 2006 in the name of Raja Bala and Reiner Eschbach and entitled "Substrate Fluorescence Mask for Embedding Information in Printed Documents" and U.S. patent application Ser. No. 11/382,869 filed May 11, 2006 in the name of Raja Bala and Reiner Eschbach and entitled "Substrate Fluorescence Pattern Mask for Embedding Information in Printed Documents" and the disclosures of both these applications are hereby expressly incorporated by reference into the present specification.

An important related aspect of the above is the ability to decode (identify and/or extract) fluorescence marks from a printed document. In a conventional method, the relevant portion of the printed document is illuminated using a UV light source so that a human observer or machine can seek to discern the presence of the fluorescence mark and confirm that the fluorescence mark matches the required/expected security mark such as a known alphanumeric code, a pattern, symbol, design or the like. A drawback of this approach is that a UV light source is required, and most conventional printed document scanners (such as those commonly used in offices to scan and store or reproduce documents) do not include the required UV light source. Also, a drawback of many prior methods is the need to use a human observer to view and decode the fluorescence mark and compare the mark to a required security mark.

SUMMARY

In accordance with one aspect of the present development, a method for identifying a fluorescence mark in a printed document includes using an image acquisition device to derive an input digital image that represents a printed document including a background and a fluorescence mark adjacent the background. The input digital image includes multiple color channel digital images, with each color channel digital image comprising a plurality of pixels each defined by a gray value. For each pixel of at least one of the color channel digital images, the gray value is adjusted based upon a variance of adjacent pixel gray values to define a filtered digital image including a plurality of pixels each defined by an adjusted gray value. Some pixels of the filtered digital image correspond to low variance regions of the input digital image and other pixels of the filtered digital image correspond to high variance regions of the input digital image. A binary image is derived that represents the filtered digital image by mapping each adjusted gray value of the filtered image to either a first or second possible binary pixel value. The binary image includes a binary representation of the fluorescence mark and a binary representation of the background.

Optionally, at least one morphological operation is performed on the binary image to adjust the pixel values of the binary representation of the background so that all pixel values of the binary representation of the background are opposite the binary pixel value used for the binary representation of the fluorescence mark.

An ASCII character for the binary representation of the fluorescence mark (or each constituent character thereof) can be derived.

In accordance with another aspect of the present development, an apparatus for identifying a fluorescence mark in a printed document without using a UV light source is provided. The apparatus includes an image acquisition device that derives an input digital image that represents a printed document including a background and a fluorescence mark adjacent the background. The input digital image includes multiple color channel digital images, with each color channel digital image comprising a plurality of pixels each defined by a gray value. The apparatus further includes means for adjusting the gray value of each pixel of at least one of the color channel digital images based upon a variance of adjacent pixel gray values to define a filtered digital image comprising a plurality of pixels each defined by an adjusted gray value. The apparatus also includes means for deriving a binary image that represents the filtered digital image by mapping each adjusted gray value of the filtered image to either a first or second possible binary pixel value, wherein the binary image includes a binary representation of the fluorescence mark and a binary representation of the background.

The apparatus optionally further includes means for performing at least one morphological operation on the binary image.

DETAILED DESCRIPTION

Figure 2A:
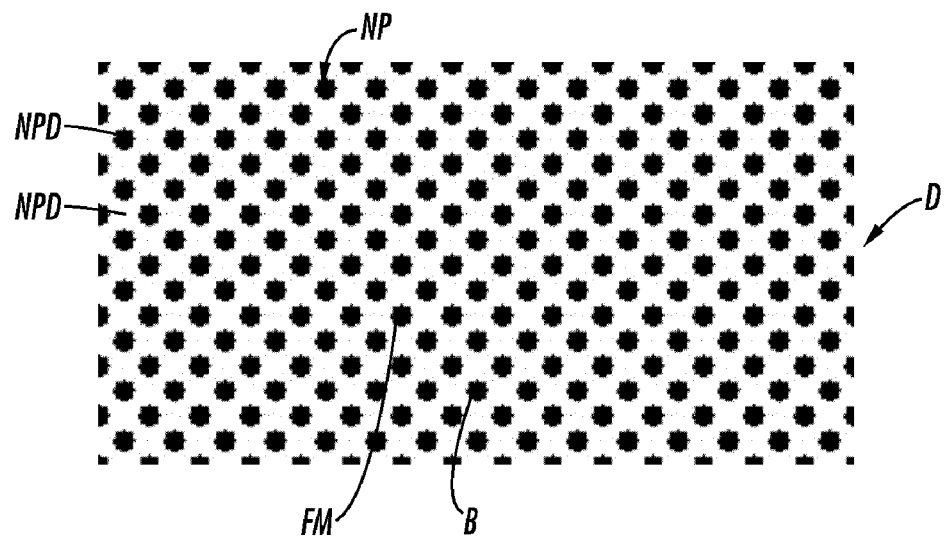
FIGS. 2A and 2B diagrammatically illustrate a printed document portion including a fluorescence mark as viewed in visible light and UV light, respectively.

FIG. 2A diagrammatically illustrates a printed document portion D, as viewed in visible light, including a background B and a fluorescence mark FM. It can be seen that the background B includes a distracting noise pattern NP. The noise pattern NP is periodic in nature, with alternating, equal sized light and dark regions or "dots" NPD. In the illustrated example, the periodicity of the noise pattern is equal in the horizontal and vertical directions and is equal to the height/width, in terms of number of pixels, of each alternating light and dark dot, e.g., the noise pattern NP can have a periodicity of 10, meaning that each dark/light region or dot thereof is 10 pixels wide and 10 pixels high. It is understood that these periodicities are commonly expressed as so-called Holladay halftone cells (as described, e.g., in U.S. Pat. No. 4,185,304, which is hereby expressly incorporated by reference) in which case a 10×20 rectangle might be used to generate the repeat cell. Other noise patterns NP can be used as a background B and it is not intended that the present development be limited to or associated with any particular noise pattern. When the document portion D is viewed in visible light, a human observer is visually distracted by the noise pattern NP of the background B so that the embedded fluorescence mark FM is less noticeable or completely hidden due to the use of a metameric colorant mixture pair for rendering the background B and fluorescence mark FM.

Figure 1:
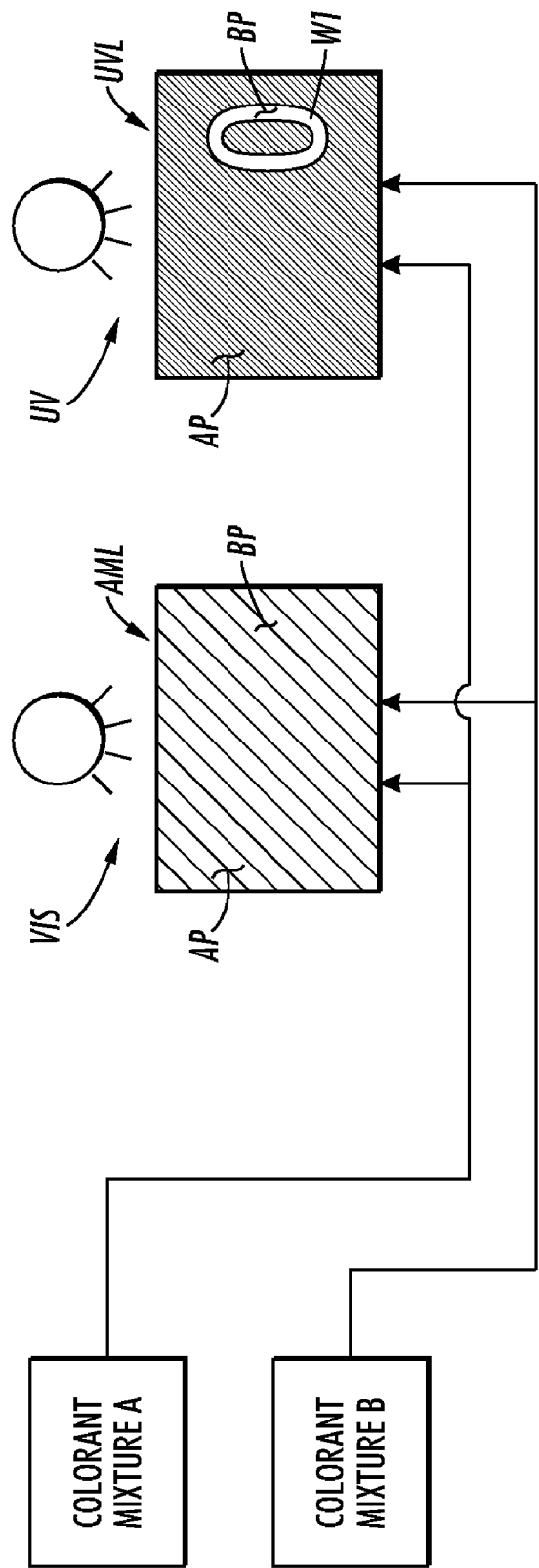
FIG. 1 (prior art) diagrammatically discloses the inclusion of a fluorescence mark in a printed document using a metameric colorant mixture pair.
Figure 2B:
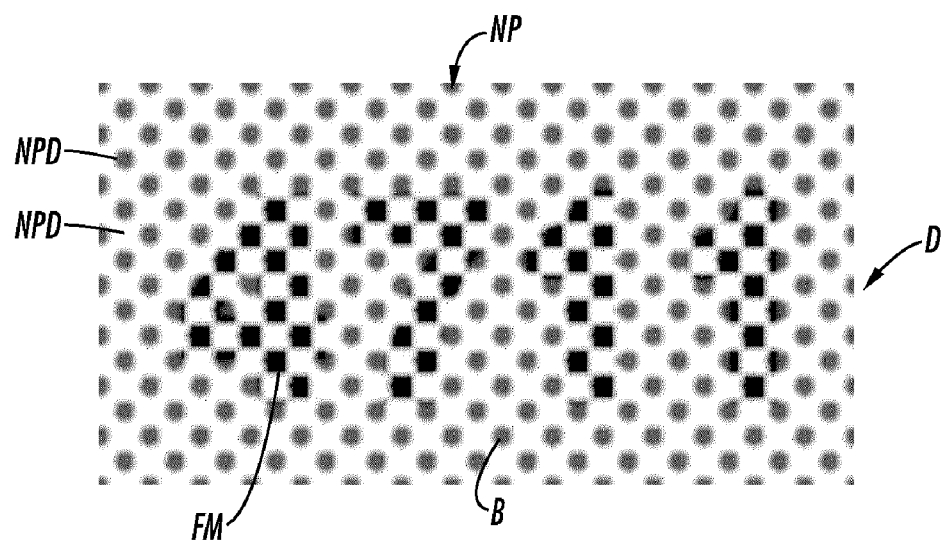

FIG. 2B shows the same printed document portion D as it would conceptually appear under UV light. It can be seen that the native substrate fluorescence is selectively suppressed so as to define the characters "4711" in a manner that is easily distinguished from the noise pattern NP of the background B. In this case, the fluorescence mark FM is printed with a colorant mixture that suppresses the native fluorescence of the paper or other substrate on which the document portion is printed to a greater extent than the colorant mixture used to print the background B, although the opposite arrangement can be employed (as shown above in FIG. 1).

In accordance with the present development, the fluorescence mark FM is decoded, i.e., identified and/or extracted from the document portion D without requiring use of a UV light source and without requiring a human observer. In particular, with reference to FIG. 3, a digital input image I of the document portion D is derived by using a scanner 10, digital camera or other image acquisition device in a step S1. The scanner or other image acquisition device must be a high resolution device, to derive a digital image I having at least 300 dots per inch (dpi) and, preferably 600 dpi or more.

The digital image data I define a representation of the document portion D in terms of a plurality of different color separations or channels, such as red R, green G, blue B (RGB) in the illustrated embodiment, with each channel defining a monochromatic image component or separation of the overall digital image I, i.e., the digital image I is defined by a combination of the monochromatic grayscale color channel images R,G,B. The image I can be defined in terms of another color space without departing from the overall scope and intent of the present development. The image data from at least one of the color channels RGB is further processed in accordance with the present development to decode the fluorescence mark FM from the printed document portion D. In the illustrated embodiment, only the data from the blue B channel image are used for such further processing, but such further processing can additionally or alternatively be carried out using the data from the red R and/or green G channels. The blue channel data are often preferred owing to the fact that the blue channel is sensitive to the presence of yellow colorant in a printed document, and the presence or absence of such yellow colorant is widely used to define fluorescence marks due to the fact that the yellow colorant is effective in suppressing substrate fluorescence while also being difficult to perceive in visible light. In essence, the two metameric colorant mixtures will differ in their colorant constituents and the yellow colorant is commonly easy to detect in commercial scanners. It is understood that other channels can also be used to distinguish the two metameric colorant mixtures, however at a general lower signal-to-noise ratio and thus at a lower accuracy in the distinction.

Figure 3:
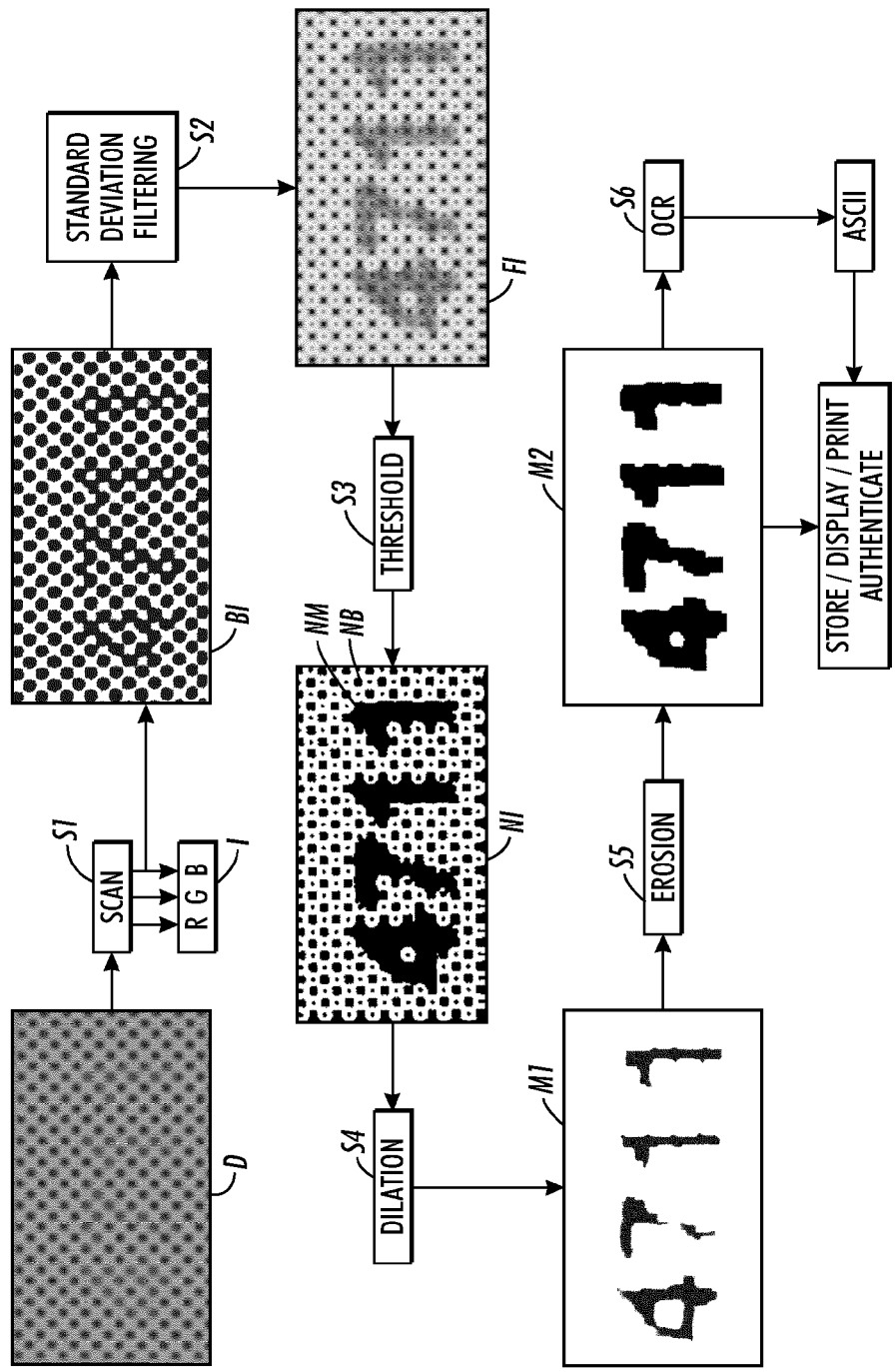
FIG. 3 is a flow chart that discloses a fluorescence mark decoding method in accordance with the present development.

The blue channel image BI defined by the blue channel data is shown in FIG. 3. The blue channel image is a grayscale image such that each pixel thereof has a value that varies between full "off" and full "on," e.g., each pixel of the blue channel image BI has a gray value from inclusively between 0 and 255, with 0 being full off (dark) and 255 being full on (light) in the case where the bit depth is 8 bits.

In the blue channel image BI, the background B and fluorescence mark FM can be distinguished somewhat by a trained human observer, but the noise pattern NP will still prevent any automated (non-human) decoding of the fluorescence mark. As such, the blue channel image BI is subjected to a filtering operation in a step S2 to separate the image information (the fluorescence mark FM) from the background noise pattern NP. One suitable filtering operation is standard deviation filtering, which is a spatial filtering operation in which the gray value of the central pixel in an N×N filter neighborhood is replaced by the standard deviation of the pixels in the neighborhood. The N×N filter is applied to each pixel of the blue channel image BI to adjust the gray value for each pixel of the blue channel image BI to derive the filtered image FI. In such case, spatial areas in the image BI of relative low variance will be darkened and spatial areas of the image BI of relative high variance will be lightened, as shown in the filtered image FI. The background noise pattern NP is made up of isolated black squares, and the fluorescence mark FM is made up of connected gray region. It should be noted in the filtered image FI, that the background noise pattern NP is still present. For best results, the filter height and width dimensions N are preferably equal to the dot periodicity of the noise pattern NP, but can vary somewhat, e.g., plus or minus 40%-50% 50%. If the periodicity is not known, it can be estimated using any known technique, e.g., using standard correlation or frequency based techniques known in the art.

This filtering operation exploits the differences in spatial structure or "texture" resulting from printing the metameric colorant mixtures of the background B and fluorescence mark FM. In other words, the members of a metameric colorant mixture pair, when printed, cover different amounts of the paper or other substrate as compared to each other (which leads to the difference in substrate fluorescence suppression), and this variation in texture between the colorant mixtures can be detected, e.g., by a standard deviation filter as described. Using the example from FIG. 1, the 50% grayscale gray colorant mixture realized with a halftone of black (K) colorant only used for colorant mixture B to print patch BP will cover much less paper when printed as compared to the colorant mixture A used to print the patch AP which comprises a high amount of yellow (Y) colorant mixed with enough cyan (C) and magenta (M) to yield a similar approximate 50% grayscale value. As such, the standard deviation in the colorant mixture B (black colorant only) region BP will be different as compared to the region AP printed with colorant mixture A (mixture of CMY colorants). As such, in the filtered image FI, some of the pixels correspond to the background noise pattern NP and other pixels correspond to the fluorescence mark FM.

To further emphasize the fluorescence mark FM relative to the background B, the filtered image FI is subjected to a thresholding operation S3 to derive a binary image NI in which each pixel is set to one of only two possible values, i.e., either "on" or "off" based on the gray value of the pixel as compared to a select threshold. In the present example, pixels of the filtered image FI having a gray value equal to or below a select threshold are set to "0" ("off" or black) and pixels having a gray value above the select threshold are set to "1" ("on" or white). The threshold used can vary. In one example, the threshold is set at a level between 60%-70% of the bit depth, i.e., between about 153 and about 180 for a bit depth of 8 bits, such that only those pixels having a value above the threshold are set to "1" (white), while all others are set to "0" (black). The threshold can be predetermined or can be derived by a histogram-based image segmentation method known in the art.

The binary image NI includes a binary representation NM of the fluorescence mark FM of the filtered image FI, and a binary representation NB of the background B of the filtered image FI. In the illustrated embodiment, the binary representation NM of the fluorescence mark comprises one or more contiguous regions of only "0" or "off" pixels that define a symbol or an alphanumeric character, and the binary representation NB of the background is defined by a periodic pattern including both "0" or "off" (black) pixels and "1" or "on" (white) pixels. In an alternative case, depending on the printed input document D and/or the filtering operation S2, the binary representation NM of the fluorescence mark comprises one or more contiguous regions of only "1" or "on" (white) pixels that define a symbol or an alphanumeric character. In either case, the binary representation NB of the background is defined by a periodic alternating pattern including both "0" or "off" (black) pixels and "1" or "on" (white) pixels.

The binary image NI is them subjected to one or more morphological operations to clarify the background NB and to improve the definition of the binary representation NM of the fluorescence mark, i.e., to adjust all or substantially all of the pixel values of the binary background NB to be opposite the single pixel value used for the binary representation NM of the fluorescence mark. In other words, if the binary representation NM of the fluorescence mark comprises only "0" or "off" (black) pixel values, all such "0" pixel values are eliminated from the binary background (and vice versa) using one or more morphological operations. In the illustrated embodiment, the morphological operation(s) include a dilation operation S4 and/or an erosion operation S5. The dilation operation S4 outputs a dilated binary image M1. Preferably, the dilated binary image M1 is subjected to the erosion operation S5 to define an eroded binary image M2. The order of the dilation and erosion operations is reversed if the binary representation NM of the fluorescence mark in the binary image NI is defined by only "1" or "on" (white) pixels instead of only "0" or "off" (black) pixels. In a dilation operation of a binary image, each pixel of the image is set to the highest value of any pixel in its neighborhood such that a pixel is set to 1 (white) if any pixel in its neighborhood has a value of 1 (white). Conversely, in an erosion operation of a binary image, each pixel of the image is set to the lowest value of any pixel in its neighborhood such that a pixel is set to 0 (black) if any pixel in its neighborhood has a value of 0 (black). The neighborhood can be one-dimensional or two-dimensional. In one example, the neighborhood is defined as an N×N area where N equals the periodicity of the dots NPD of the background noise pattern NP.

The eroded binary image M2 (or the dilated binary image M1) provides an output image that is suitable for further conventional digital image processing operations to extract, print, display, store and/or otherwise use or manipulate the binary representation NM of the fluorescence mark FM. In the illustrated example, the output image M2 (or the dilated binary image M1) is subjected to an optical character recognition (OCR) operation to derive an ASCII character for each constituent feature or characters of the fluorescence mark that represent an ASCII alphanumeric character (the numbers "4" "7" "1" "1" in the present example). These ASCII characters can also be printed or displayed or stored as desired. Also, the output image M2 itself and/or the ASCII output can be input to an authentication system to compare the extracted fluorescence mark FM against a security code or template.

Alternatively, the morphological operations can be omitted and the binary image NI can be used directly, i.e., printed, displayed, stored and/or otherwise used, i.e., the binary representation NM of the fluorescence mark can sometimes be "good enough" to verify the presence of the expected fluorescence mark FM in the printed document D.

Figure 4:
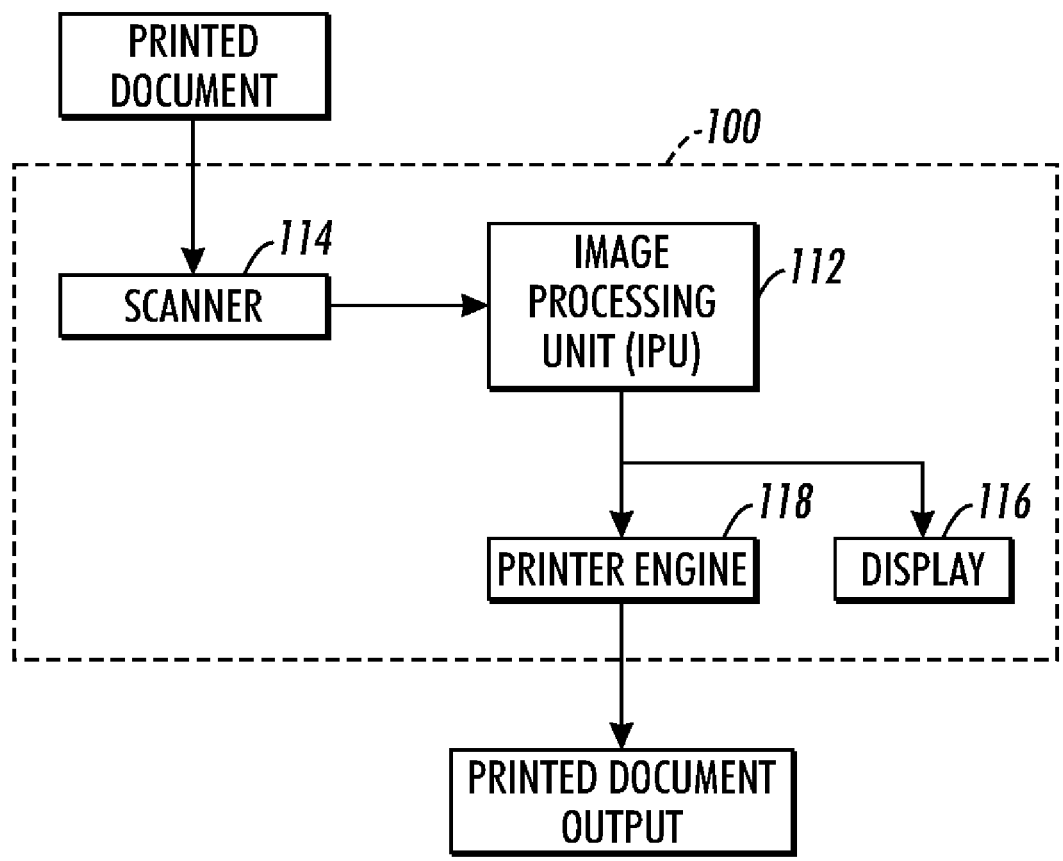
FIG. 4 illustrates an example of a system for implementing a fluorescence mark decoding method in accordance with the present development.

FIG. 4 illustrates one example of a system and apparatus for implementing a method in accordance with the present development. The system 100 comprises an image processing unit (IPU) 112 for carrying out the digital image processing operations disclosed herein. The IPU 112 is defined by electronic hardware circuitry and/or software that is dedicated to digital image processing and/or can comprise a general purpose computer programmed to implement the image processing operations disclosed herein. The apparatus 100 comprises a document scanner 114 or other image acquisition device (e.g., a digital camera) that is operably connected to the IPU 112 directly or through a network or other means. The document scanner must be of high enough resolution to detect ink/toner structural coverage variations in a printed document D scanned thereby as disclosed above, e.g., at least 300 dots per inch (dpi) and most preferably at least 600 dpi. The apparatus 100 preferably also comprises output devices such as a visual display 116 such as a CRT, LCD, or other display means and a printer engine 118 including a xerographic, ink-jet, or other print engine for printing the image data on paper or another recording medium using toner and/or ink as is known in the art, using the CMYK or other multi-colorant system.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for identifying a fluorescence mark in a printed document without using a UV light source, said method comprising:
   using an image acquisition device to derive an input digital image that represents a printed document including a background and a fluorescence mark adjacent the background, said input digital image comprising multiple color channel digital images, with each color channel digital image comprising a plurality of pixels each defined by a gray value;
   for each pixel of at least one of said color channel digital images, adjusting the gray value of the pixel based upon a variance of adjacent pixel gray values to define a filtered digital image comprising a plurality of pixels each defined by an adjusted gray value;
   deriving a binary image that represents said filtered digital image by mapping each adjusted gray value of the filtered image to either a first or second possible binary pixel value, said binary image comprising a binary representation of said fluorescence mark and a binary representation of said background.

2. The method as set forth in claim 1, wherein said binary representation of said fluorescence mark is defined by only one of the first and second possible binary pixel values, and said binary representation of said background is defined by both of said first and second possible binary pixel values arranged in a periodic alternating pattern.

3. The method as set forth in claim 2, further comprising:
   performing at least one morphological operation on the binary image to adjust the pixel values of the binary representation of the background so that all pixel values of the binary representation of the background are opposite all pixel values used for the binary representation of the fluorescence mark.

4. The method as set forth in claim 3, wherein said at least one morphological operation comprises:
   a dilation operation followed by an erosion operation when said binary representation of said fluorescence mark is defined by the first of said first and second possible binary pixel values.

5. The method as set forth in claim 3, wherein said at least one morphological operation comprises:
   an erosion operation followed by a dilation operation when said binary representation of said fluorescence mark is defined by the second of said first and second possible binary pixel values.

6. The method as set forth in claim 3, wherein said step of adjusting the gray value of each pixel of said at least one color channel digital image based upon a variance of adjacent pixel gray values comprises using a standard deviation filter to replace the gray value of each pixel of said at least one color channel digital image with the standard deviation of the pixel gray values in a neighborhood surrounding the pixel.

7. The method as set forth in claim 1, wherein said step of adjusting the gray value of each pixel of said at least one color channel digital image based upon a variance of adjacent pixel gray values comprises using a standard deviation filter to replace the gray value of each pixel of said at least one color channel digital image with the standard deviation of the pixel gray values in a neighborhood surrounding the pixel.

8. The method as set forth in claim 7, wherein some pixels of said filtered digital image correspond to low variance regions of said input digital image and other pixels of said filtered digital image correspond to high variance regions of said input digital image.

9. The method as set forth in claim 8, wherein said background of said printed document includes a printed noise pattern comprising dark dots that extend in both horizontal and vertical directions, wherein said dark dots alternate in both said horizontal and vertical directions with a periodicity of N pixels.

10. The method as set forth in claim 1, wherein said multiple color channel digital images comprise red, green, and blue channel digital images.

11. The method as set forth in claim 10, wherein said at least one of said multiple color channel digital images includes said blue channel digital image.

12. The method as set forth in claim 10, wherein said at least one of said multiple color channel digital images includes only said blue channel digital image.

13. The method as set forth in claim 1, further comprising:
   deriving one or more ASCII characters from said binary representation of said fluorescence mark in said binary image.

14. The method as set forth in claim 13, wherein said step of deriving one or more ASCII characters comprises performing an optical character recognition process on said binary image.

15. The method as set forth in claim 13, further comprising comparing said one or more ASCII characters to a known security code to authenticate said printed document.

16. The method as set forth in claim 1, wherein said step of deriving a binary image that represents said filtered digital image comprises comparing each adjusted gray value of the filtered image to a threshold value to derive either said first or second binary value.

17. An apparatus for identifying a fluorescence mark in a printed document without using a UV light source, said apparatus comprising:

an image acquisition device that derives an input digital image that represents a printed document including a background and a fluorescence mark adjacent the background, said input digital image comprising multiple color channel digital images, with each color channel digital image comprising a plurality of pixels each defined by a gray value;

means for adjusting the gray value of each pixel of at least one of the color channel digital images based upon a variance of adjacent pixel gray values to define a filtered digital image comprising a plurality of pixels each defined by an adjusted gray value;

means for deriving a binary image that represents said filtered digital image by mapping each adjusted gray value of the filtered image to either a first or second possible binary pixel value, said binary image comprising a binary representation of said fluorescence mark and a binary representation of said background.

18. The apparatus as set forth in claim 17, wherein said image acquisition device comprises a scanner.

19. The apparatus as set forth in claim 17, further comprising:

means for performing at least one morphological operation on the binary image to adjust the pixel values of the binary representation of the background so that all pixel values of the binary representation of the background are opposite all pixel values of the binary representation of the fluorescence mark.

20. The apparatus as set forth in claim 17, wherein said means for adjusting the gray value of each pixel of said at least one color channel digital image based upon a variance of adjacent pixel gray values comprises means for standard deviation filtering, said means for standard deviation filtering adapted to replace the gray value of each pixel of said at least one color channel digital image with a standard deviation of the pixel gray values in a neighborhood surrounding the pixel.

* * * * *